Patented Oct. 9, 1928.

1,687,269

UNITED STATES PATENT OFFICE.

ALBERT K. EPSTEIN, OF CHICAGO, ILLINOIS.

EGG PRODUCT AND PROCESS FOR PRODUCING THE SAME.

No Drawing. Application filed December 24, 1926. Serial No. 156,997.

My invention relates to egg products and process for producing the same, being directed more particularly to an egg yolk product and an object being to provide such a product treated to reduce the original content of bacteria and other micro-organisms to a negligible number and prevent bacterial decomposition and putrefaction when in a liquid state at ordinary room temperatures and further treated so as to give a resultant mixture having less viscosity and more mobility than the yolk treated alone with acid for bacteria reduction, after freezing and thawing.

In the treatment of the egg yolk to prevent microbial decomposition, I have discovered that acid alone is very effective. But the yolk treated with acid alone frozen and thawed out is not most desirable for all uses, in that among other reasons it is too firm and does not have sufficient mobility or fluidity. I have discovered that this characteristic may be modified by the addition of a suitable substantially neutral edible salt system such as sodium chloride, or its equivalent, which may be added in amounts according to results desired and which depends to some extent upon the use to be made of the product.

The neutral salt is added in a proportion sufficient to make the product, after freezing and thawing, more mobile, than the yolk product to which acid alone is added, frozen and then thawed out. For some purposes it is necessary to have a yolk product which should have fluidity and mobility and which can easily be incorporated and emulsified with other materials such as oils.

When the acid itself is used with yolks and the resultant mixture frozen and thawed, the product after thawing is firm and has practically no mobility. If, however, a sufficient amount of sodium chloride or an equivalent neutral salt system is added to the acid and yolk mixture before freezing and thawing the resultant product after freezing and thawing is viscous and yet has mobility. Such a product can be incorporated and emulsified with other materials and is of a viscosity greater than the fresh yolk before freezing. In case an acid is used which is in a solid state, it can be dissolved in water in a concentrated form and a proportionate amount added with the salt to the yolk mixture. The salts used may also be added in a dry state or may be added with water or with the acid solution. I do not limit myself to any specific way of carrying out the process as any procedures used which will make possible the addition of a suitable amount of acid and a suitable amount of neutral salt to produce the results herein specified are considered to come within the scope of this invention.

In connection with the acid treatment of the egg yolk, this is being claimed in a copending application filed of even date herewith, Serial No. 156,995, the present application being directed to the product in which the acid and salt treatment are combined and applied to the yolk product. I have also discovered that the commercial yoke treated with a substantially neutral edible salt system develops a product having certain advantages and this latter product and process is being claimed in an application of mine filed of even date herewith, Serial No. 156,996.

When sufficient acid alone is used to prevent microbial decomposition of the yolk material, it also reacts with the protein material of the yoke and changes the physical consistency of the product after freezing and thawing, increasing the viscosity to such an extent that the product becomes substantially immobile, when frozen and thawed. However, if a sufficient quantity of a neutral salt system such as sodium chloride is added, it changes and modifies the action of the acid on the protein material to such an extent that the ultimate product after freezing and thawing has a mobility and viscosity, and the product is smooth in consistency. This mutual reaction of the acid and salt on the protein material to produce the above effect takes place only when the salt is within the limits of required proportion or concentration. If too high a concentration of salt is used it will not have any substantial effect in modifying the said action of the acid, and the same with too small a proportion of salt.

The mutual interaction of the acid, salt system and yolk is also registered in the color of the ultimate product. If salt only, such as sodium chloride, is added to the yolk, the yolk substance will adsorb a certain amount of the chlorine ion making the mixture more alkaline and changing the color of the yolk material from yellow to a darker shade, and more of a brownish tint. This phenomenon takes place especially if a one component neutral salt system like sodium chloride is used. When a two component neutral salt system, such as a buffer mixture of phosphates mentioned herein is used, this change of color is not so pronounced on account of the buffer action. However, the addition of the two component salt system, on account of its salt effect, modifies the action of the acid on the yolk substance with reference to the viscosity of the ultimate product after freezing and thawing, so as to secure the more desirable viscosity and fluidity.

In carrying out the present invention I take a batch of commercial egg yolk, which is egg yolk separated from the white but in which small amounts of the white may adhere to the yolk during separation. The amount of white adhering to the yolk substance depends upon the care exercised in separating. With this egg yolk I incorporate desired proportions of a suitable edible acid and a suitable substantially neutral edible salt system, the proportions and particular ingredients used extending over some range, and depending upon the amount of white present.

As to the acid, I use one which is capable of reducing bacteria and other micro-organisms to substantially a negligible number and prevent microbial decomposition of the yolk substance at normal room temperature, and to this end I have found that various acids may be used such as acetic and others of an equivalent character, such as citric, phosphoric, tartaric, lactic, malic or succinic. The amount or proportion of acid used may vary, but I preferably treat the product so that the original content of micro-organisms is reduced to a negligible or harmless extent and bacterial decomposition is prevented. The acid substance may be added in a normal state or in a concentrated solution in water, or as in the case of citric acid it may be added in a concentrated form of lemon juice, or in the powdered form of lemon juice in the proper proportion with reference to the acid content.

With reference to the salt system I preferably use common table salt, or in other words sodium chloride, although I contemplate using other neutral salt systems such as an alkaline sodium phosphate $$(NA_2HPO_4 12H_2O)$$

treated with sufficient acid sodium phosphate $(NAH_2PO_4)$ to give a substantially neutral phosphate mixture. Or tri-sodium citrate (which is slightly alkaline) treated with sufficient citric acid or some other edible acid to render the sodium citrate neutral. The use of the above will eliminate the extreme salty taste present where the larger percentage of salt is used and thus renders the product usable where the sodium chloride treatment would be objectionable.

I also find that I may use another substantially neutral edible salt system in the form of tri-sodium phosphate $(NA_3PO_4)$ which is strongly alkaline, and treat it with sufficient phosphoric acid, which is strongly acid, to give a substantially neutral phosphate salt system.

The salt system may be added in its normal state, or with water, or in combination with the acid or acid solution.

In mixing the ingredients I preferably take a suitable amount of the commercial egg yolk such, as ninety-five pounds, and to this add four and two-tenths (4.2) pounds of sodium chloride, or any other suitable edible neutral salt system, and eight-tenths (.8) of a pound of acetic acid or any of the other equivalent acids or substance capable of liberating hydrogen ions when in contact with the yolk substance. These ingredients are placed into a suitable mixer and thoroughly mixed for a few minutes and then poured into cans and frozen. Of course, other treatment of the product may be applied if desired, but the one referred to I have found to give a desirable commercial product which is sold to the users where it is thawed and combined with other ingredients as is well known. In other words, I add to the yolk substantially one-half to one and one-half per cent of the desired acid and two to eight per cent of the desired salt system. I have found that these proportions give the most desirable results for the ordinary uses of the product.

What I claim as new and desire to secure by United States Letters Patent is:—

1. The method of producing an egg product consisting of adding to egg yolk an edible acid capable of and in sufficient quantity to reduce bacterial decomposition of the yolk substance at ordinary room temperatures; incorporating a sufficient proportion of a substantially neutral edible water soluble salt system to substantially modify to a desirable degree the viscosity and mobility of the acid treated yolk after freezing and thawing, and freezing the mixture.

2. As a new article of manufacture, a frozen product consisting of egg yolk combined with an edible acid capable of and in a proportion sufficient to reduce bacterial decomposition of yolk, and a sufficient proportion of a suitable substantially neutral edible salt system to substantially modify the product and to produce a viscosity and mobility thereof of a desirable degree after freezing and thawing.

3. The method of manufacturing a frozen egg yolk product including freezing egg yolk treated by adding sodium chloride and an edible acid substance capable of reducing bacterial decomposition in proportions sufficient to produce an ultimate product which after being sufficiently frozen and thawed has a soft smooth consistency.

4. The method of manufacturing a frozen egg product including treating egg yolk by incorporating therewith an edible acid capable of and in sufficient quantity to reduce bacterial decomposition and modify the physical consistency of the yolk after freezing and thawing, and substantially 8% of sodium chloride, and freezing the product.

5. The method of manufacturing a frozen egg product including treating egg yolk by incorporating therewith an edible acid capable of reducing bacterial decomposition of the yolk and sodium chloride, the proportions of acid and sodium chloride being such as to produce a mutual reaction of the acid and salt on the yolk material sufficiently to produce an ultimate product after freezing and thawing having a mobility and viscosity resulting in a texture smooth in consistency, and freezing the mixture.

6. As a new article of manufacture, an egg product including egg material consisting essentially of egg yolk combined with an edible acid capable of and in sufficient quantity to reduce bacterial decomposition and modify the physical consistency of the product after freezing and thawing, and a proportion of sodium chloride in sufficient quantity to materially modify the consistency of the ultimate product, preliminarily frozen and thawed.

7. As a new article of manufacture, a frozen egg product including egg material consisting essentially of egg yolk combined with an edible acid capable of and in sufficient quantity to reduce bacterial decomposition and modify the physical consistency of the product after freezing and thawing, and substantially 8% of sodium chloride.

8. As a new article of manufacture, an egg product including egg material consisting essentially of egg yolk combined with an edible acid capable of and in sufficient quantity to reduce bacterial decomposition and modify the physical consistency of the product after freezing and thawing, and 8% of sodium chloride, preliminarily frozen and thawed and in a soft state possessing a smooth consistency.

9. As a new article of manufacture, a frozen egg product including egg material consisting essentially of egg yolk combined with suitable proportions of sodium chloride and an edible acid capable of liberating hydrogen ions when in contact with the yolk substance, to materially modify the physical characteristic of the ultimate product after freezing and thawing to a soft smooth consistency.

10. As a new article of manufacture, an egg product including egg material consisting essentially of egg yolk combined with suitable proportions of sodium chloride and an edible acid capable of liberating hydrogen ions when in contact with the yolk substance, in sufficient quantity to materially modify the physical characteristic of the ultimate product, preliminarily frozen and thawed, the product being in a soft state and possessing a smooth consistency.

In witness whereof, I hereunto subscribe my name, this 18th day of December, 1926.

ALBERT K. EPSTEIN.